US006985439B2

(12) United States Patent
Hosein

(10) Patent No.: US 6,985,439 B2
(45) Date of Patent: Jan. 10, 2006

(54) SYSTEM AND METHOD FOR WIRELESS NETWORK ADMISSION CONTROL BASED ON QUALITY OF SERVICE

(75) Inventor: Patrick Ahamad Hosein, San Diego, CA (US)

(73) Assignee: Telefonaktiebolaget LM Ericsson (publ), (SE)

( * ) Notice: Subject to any disclaimer, the term of this patent is extended or adjusted under 35 U.S.C. 154(b) by 460 days.

(21) Appl. No.: 10/280,963

(22) Filed: Oct. 25, 2002

(65) Prior Publication Data

US 2004/0082363 A1 Apr. 29, 2004

(51) Int. Cl.
*H04Q 7/20* (2006.01)
*H04B 7/00* (2006.01)

(52) U.S. Cl. .................. 370/230; 455/450; 455/452.2; 455/509; 370/232; 370/437

(58) Field of Classification Search ........ 455/450–451, 455/452.1, 452.2, 453–454, 509, 512–513; 370/230–234, 395.2, 437
See application file for complete search history.

(56) References Cited

U.S. PATENT DOCUMENTS

| | | | | |
|---|---|---|---|---|
| 5,740,537 | A * | 4/1998 | Beming et al. | 455/450 |
| 5,884,174 | A * | 3/1999 | Nagarajan et al. | 455/436 |
| 6,377,548 | B1 * | 4/2002 | Chuah | 370/233 |
| 6,631,269 | B1 * | 10/2003 | Cave | 455/450 |
| 6,801,501 | B1 * | 10/2004 | Knightly et al. | 370/233 |
| 6,876,857 | B1 * | 4/2005 | Nee et al. | 455/450 |
| 2004/0152422 | A1 * | 8/2004 | Hoglund et al. | 455/67.11 |
| 2004/0203820 | A1 * | 10/2004 | Billhartz | 455/452.1 |

FOREIGN PATENT DOCUMENTS

| | | |
|---|---|---|
| EP | 0 913 968 | 5/1999 |
| EP | 1 079 650 | 2/2001 |
| EP | 1 100 283 | 5/2001 |
| EP | 1 154 663 | 11/2001 |
| EP | 1 220 561 | 7/2002 |
| EP | 1 227 695 | 7/2002 |

OTHER PUBLICATIONS

U.S. Appl. No. 09/972,793, filed Oct. 5, 2001, System And Method For User Scheduling In A Communication Network; 34 pgs.

A Generalized Scheduling Algorithm For HRPD Wireless Networks; Patrick A. Hosein; 6 pgs.

* cited by examiner

*Primary Examiner*—Simon Nguyen
(74) *Attorney, Agent, or Firm*—Coats & Bennett, P.L.L.C.

(57) ABSTRACT

Admission to one or more shared resources in a wireless network is based on whether such admission would unduly comprise the network's ability to meet one or more Quality-of-Sevice (QoS) constraints associated with users of the shared resources. Therefore, use of a resource, such as the shared use of a high-speed packet data channel, may be scheduled for current and newly admitted users in consideration of the QoS constraints associated with those users. By evaluating the QoS penalty that would be incurred with the admission of a prospective new user, an admission controller determines whether such admission would unduly comprise an associated resource scheduler's ability to meet the QoS constraints associated with user's of the shared resource. Thus, new users are admitted or blocked based on the penalty incurred. Users may be preferentially admitted by tolerating higher penalties for some users, such as those in a preferred user class.

29 Claims, 4 Drawing Sheets

SYSTEM AND METHOD FOR WIRELESS NETWORK ADMISSION CONTROL BASED ON QUALITY OF SERVICE

BACKGROUND OF THE INVENTION

The present invention generally relates to scheduling users in a wireless communication network, and particularly relates to scheduling such users according to one or more Quality of Service (QoS) guarantees.

Many aspects of operation in the typical wireless communication network reflect the natural tension between serving as many users as possible, i.e., maximizing revenue, while still providing those users with acceptable quality of service and maintaining the network within its capacity limits. For example, several of the evolving network standards feature one or more relatively high-speed data channels that are time-shared between a potentially large pool of users. High-speed packet data channels such as those defined in 1xEV-DO and 1xEV-DV variants of cdma2000, as well as the High Speed Downlink Packet Access (HS-DPA) channel defined in Wideband CDMA (WCDMA), stand as examples of such time-shared, scheduled-use channels.

Traditionally, such scheduling focuses either on maximizing the aggregate data rate of shared service, or on ensuring some degree of service "fairness" between users sharing the packet data channel. The former approach is often referred to as "Maximum Carrier-to-Interference" scheduling (Max C/I scheduling) because the users having the best channel conditions, i.e., the best carrier-to-interference ratio, are preferentially scheduled since those users can be served at higher data rates than users with less favorable channel conditions. The latter approach often is referred to as "Proportional Fair" scheduling because users are preferentially serviced based on their past average rates of service relative to their requested rates. That is, a historically underserved user moves higher in preference as that user's average data rate falls increasingly short of that user's requested data rate.

Some approaches to user scheduling combine aspects of proportional fair and Max C/I scheduling, while other approaches eschew the "steepest gradient," derivative-based analyses of both the Max C/I and proportional fair scheduling techniques, looking instead at the aggregate benefit associated with serving particular ones of the users. Regardless, one longstanding shortcoming of existent approaches to user scheduling is the failure to observe or otherwise comply with QoS standards applicable to individual users, or to classes of users.

Such a shortcoming is exacerbated by the increasing emphasis on QoS as network service providers and users explore various approaches to a wide range of data services, with each service type having varying and, oftentimes, distinct levels (and types) of QoS constraints for acceptable performance. That is, some types of services may require minimum values for one or more QoS parameters. For example, video streaming applications demand well-constrained overall packet delivery latencies as well as minimal packet jitter. Moreover, at least some users in general are likely willing to pay for higher QoS guarantees. However, entering into service contracts with such QoS guarantees obligates service providers to work toward the guaranteed levels of service, which requires that user-scheduling decisions incorporate consideration of such QoS guarantees.

SUMMARY OF THE INVENTION

The present invention comprises a method and apparatus providing QoS-based shared resource admission control in a wireless communication network. In an exemplary embodiment, the inventive admissions control provides QoS-based admission control for a shared packet data channel, such as those used in cdma2000 and WCDMA wireless networks. In such embodiments, an admission controller evaluates whether the admittance of new users would unduly compromise the network's ability to meet the QoS guarantees associated with the current users of the shared packet data channel.

In an exemplary embodiment, the admission controller assesses the "QoS penalty" that would be incurred if a prospective new user is admitted based on the extent to which admitting the new user might cause the network to not meet QoS guarantees for current users. If the calculated QoS penalty exceeds a defined threshold, the user is not admitted. Such threshold-based blocking may be biased for the prospective user's contracted Grade of Service (GoS) and/or user class, such that admission control is biased toward the admission of premium users. That is, specific users or classes of users may be associated with higher penalty thresholds such that they are more likely to be admitted than users associated with lower penalty thresholds.

In one or more exemplary embodiments, each one or more Radio Base Stations (RBSs) periodically report current total penalty values for shared resources, such as shared packet data channels, to a Base Station Controller (BSC) that includes the inventive admission controller. Each RBS provides one or more shared packet data channels subject to admission control by the BSC. When a prospective new user requests access to one of these shared channels, the BSC uses the current penalty value(s) to determine the expected total penalty that would be incurred with admission of the prospective user. As an example, the current total penalty might be computed based on the amount by which each current user's average served rate falls short of that user's guaranteed rate. Thus, the change in total penalty may be computed as the amount by which this shortfall would increase with admission of the new user. Of course, the penalty calculation may be significantly more complex and consider multiple QoS parameters associated with the current users, as well as other limiting factors associated with serving users on the shared channel.

In general, however, the BSC at least determines whether the projected total penalty exceeds a defined threshold as the basis for admitting or blocking the prospective user. As noted, the BSC may be provisioned with supporting admission control information, including user class data, which allows the BSC to bias its admission control toward premium users by, for example, tolerating a higher penalty value for premium users as compared to non-premium users. Further, the provisioning information stored at the BSC, or accessible to the BSC via another network entity, may include more detailed individual user settings that permit the network operator to increase revenue by charging individual users for higher levels of admissions preference.

DETAILED DESCRIPTION OF THE INVENTION

Figure 1:
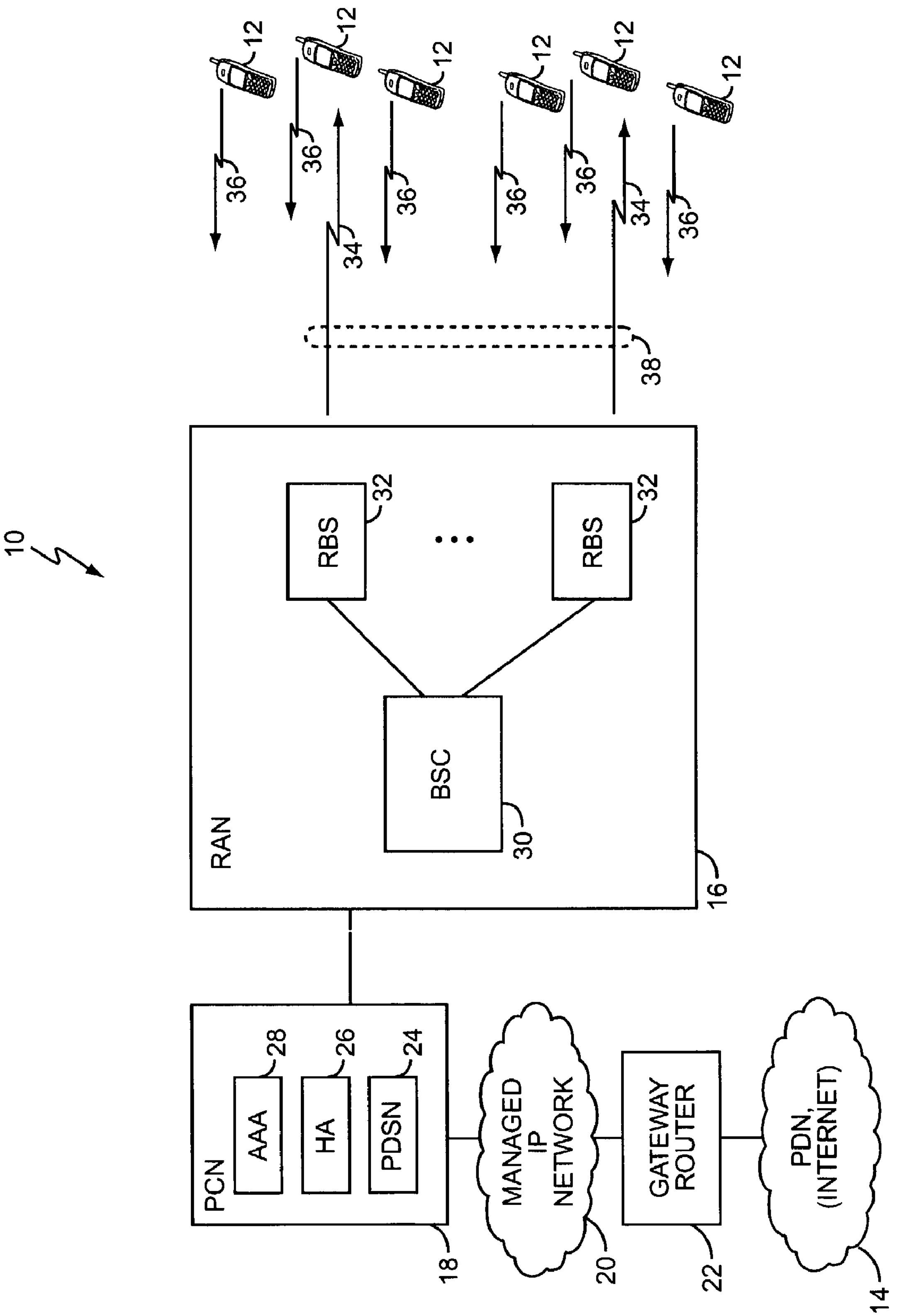
FIG. 1 is a diagram of an exemplary wireless communication network.

FIG. 1 illustrates an exemplary wireless communication network 10, which may be implemented, for example, in accordance with cdma2000 standards. Those skilled in the art will appreciate that network 10 may be implemented according to a wide range of other network standards, including WCDMA, and that other network implementations might use slightly different exemplary architectures and different nomenclature for the various network entities.

In any case, network 10 communicatively couples a plurality of mobile stations 12 with one or more Public Data Networks (PDNs) 14, such as the Internet. A Radio Access Network (RAN) 16 provides the interface between the mobile stations 12 and a Packet Core Network (PCN) 18, which supports the packet data connections between the mobile stations 12 and the PDN 14, and which couples to PDN 14 through a managed IP network 20 and associated gateway router 22.

In an exemplary embodiment, RAN 16 comprises one or more Base Station Systems (BSSs), each comprising a Base Station Controller (BSC) 30 and one or more associated Radio Base Stations (RBSs) 32. Each RBS 32 includes assignable radio resources that may be selectively configured by the controlling BSC 30 for supporting communications with particular ones of the mobile stations 12. Thus, each BSS provides an interface between the PCN 18 and the mobile stations 12 (i.e., users).

Supporting that interface function, RAN 16 transmits traffic and control signaling to the mobile stations 12 on a forward radio link 34, and receives reverse traffic and signaling from those mobile stations 12 on a reverse radio link 36. Forward link 34 and reverse link 36 typically comprise a set of shared and dedicated channels supporting communication with and control of each active mobile station 12 that is collectively referred to as an "air interface" 38. Those skilled in the art will appreciate that the particular network standard adopted by network 10 will dictate the particulars of the air interface 38 but for purposes of the present invention, it is assumed that air interface 38 includes one or more shared packet data channels that are managed by network 10 as a shared resource.

Examples of such shared packet data channels include the High Rate Packet Data (HRPD) channels in 1xEV implementations of cdma2000 (see the TIA/EIA/IS-856 standard), and the High Speed Downlink Packet Access (HSDPA) channels used in WCDMA networks. With such shared packet data channels, a plurality of "users" share the packet data channel, with each user receiving scheduled data transmissions on the packet data channel. In this context, the term "user" connotes a logical data connection supported by the packet data channel. Nominally, each user of the packet data channel corresponds to one of the plurality of mobile stations 12 sharing a given packet data channel, but it should be understood that a single mobile station 12 can, in some embodiments, have multiple data connections with the network 10.

Figure 2:
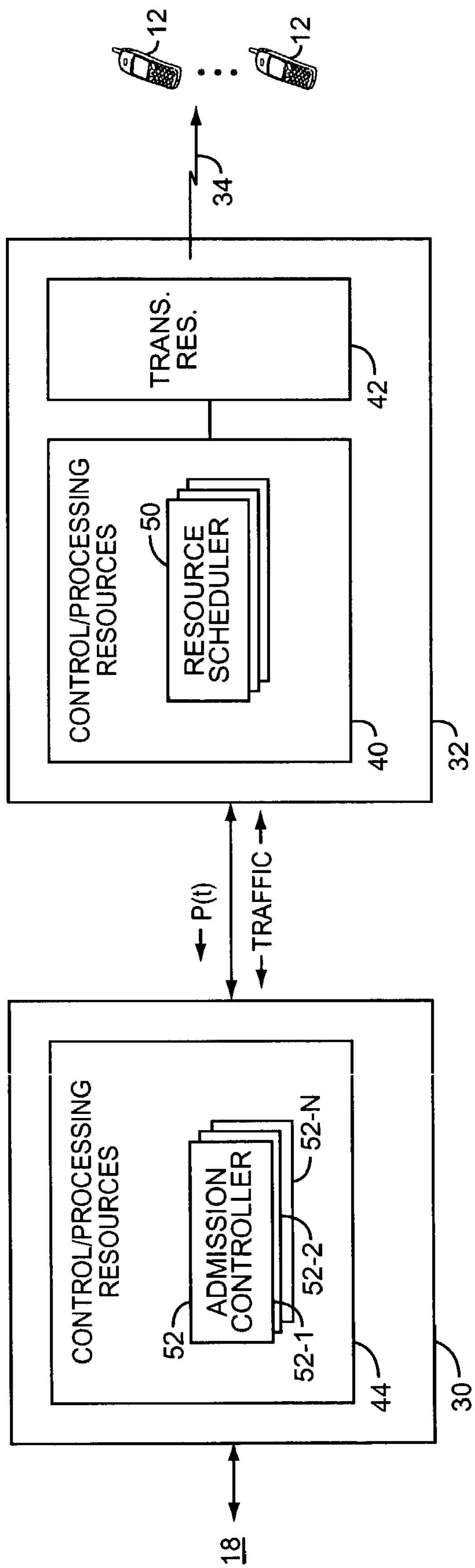
FIG. 2 is a diagram of an exemplary base station controller for use in the network of FIG. 1.

FIG. 2 illustrates exemplary embodiments for a BSC 30 and an associated RBS 32, wherein the RBS 32 and BSC 30 support communication between the mobile stations 12 and PCN 18. In operation, RBS 32 performs user-scheduling operations on the shared packet data channel(s), while BSC 30 provides overall RBS control and new user admission control for those channels and, possibly, channels provided by other RBSs 32 operating under control of BSC 30. RBS 32 comprises control/processing resources 40 and transceiver resources 42. Similarly, BSC 30 comprises control/processing resources 44. Those skilled in the art will recognize that control and processing resources 40 (and 44) typically comprise control logic including a collection of processors and/or processing subsystems, and supporting memory/storage elements, cooperatively operating to provide required traffic processing and signaling functions.

Regardless of the particular hardware implementations, the exemplary RBS 32 includes a resource scheduler 50 that schedules service for current users of a shared packet data channel provided by RBS 32 on the forward radio link 34. Positioning scheduler 50 in the RBS 32 enables it to make scheduling changes in response to rapidly changing radio conditions. In an exemplary implementation, scheduler 50 provides QoS-based scheduling of the shared packet data channels, while an admission controller 52 in BSC 30 provides complementary admission control functions that govern the admission of prospective new users to the shared packet data channel(s) supported by the BSC 30 and RBS 32. Positioning admission controller 52 in BSC 30 enables it to perform admission control based on its more "global" picture of available system resources.

In a typical scenario, a shared packet data channel is supported by one or more of the RBSs 32, with use of the channel controlled by scheduler 50 according to one or more QoS guarantees associated with the current users of the channel, and in accord with overall scheduling goals. Thus, in an exemplary embodiment of the present invention, the QoS-based scheduler 50 schedules use of a shared packet data channel to meet one or more QoS guarantees associated with the users of that channel. By basing its scheduling operations on QoS guarantees, the network service provider has a credible basis from which it can enter into QoS-based service agreements with its subscribers. That is, QoS-based scheduling allows the service provider to offer differently priced "tiered" services where users that want "better" or "faster" service may contract for the service level(s) desired.

To better understand the inventive QoS-based scheduling, it may be helpful to discuss the basics of user scheduling. Generally, the "utility" of serving each user is represented by a "utility function," $U_i(r_i)$, where i denotes the ith user, and $r_i$ denotes the average served rate for the ith user. A general scheduling challenge thus involves maximizing an objective function expressed as, $$\text{maximize } F(\vec{r}) \equiv \sum_{i=1}^{k} U_i(r_i) \tag{1}$$

$$\text{subject to } \sum_{i=1}^{k} r_i < C \tag{2}$$

over $$r_i \geq 0, 1 \leq i \leq k \tag{3}$$

where k=the number of active users sharing the packet data channel in question, $r_i$=the average throughput (average served data rate) of user i, and C=the packet data channel capacity. Thus, at each scheduling decision point, scheduler 50 would evaluate the objective function, $F(\vec{r})$, to determine which user(s) should be served. That evaluation involves jointly evaluating the set of utility functions for all users currently sharing the channel at each scheduling decision point. Additional information regarding scheduling may be found, for example, in the co-pending and commonly assigned U.S. patent application entitled "System and Method for User Scheduling in a Communication Network," which was filed on Oct. 5, 2001 and is assigned Ser. No. 09/972,793, and which is incorporated by reference herein.

The overall scheduling behavior of scheduler 50 is driven in large measure by the choice of the utility functions, $U_i(r_i)$. Past approaches to utility function selection include "Proportional Fair" (PF) scheduling and Maximum Carrier-to-Interference Ratio (Max C/I) scheduling. With the former approach, ongoing scheduling operations are driven by the objective to "fairly" serve each user at a rate proportional to that user's radio conditions. With the latter approach, ongoing scheduling operations are driven by the objective of maximizing aggregate channel throughput. That is, scheduling preference is biased toward users having the best radio conditions because those users can be serviced at a higher data rate than users with poorer radio conditions.

Scheduler 50 incorporates QoS constraints into its scheduling decisions such that users are scheduled to ensure compliance with one or more QoS guarantees associated with the current users. In an exemplary approach, each user's utility function, $U_i(r_i)$, is formed as the combination of a base function, $G_i(r)$, and a barrier function, $B_i(r)$. The parameters of the barrier function may be set in accordance with one or more QoS parameters associated with the corresponding user. That is, the barrier functions may be used to bias the evaluation of the users' utility functions such that operation of scheduler 50 provides ongoing user scheduling that conforms to each user's associated QoS guarantees.

Thus, in an exemplary embodiment, the barrier functions reflect the QoS constraints associated with each user's connection to network 10. The users might be serviced according to their respective "user classes," where the QoS guarantees applied to user scheduling is a function of user class. For example, the network operator might define "gold," "silver" and "bronze" user classes, where gold users are scheduled preferentially with respect to silver and bronze users, and silver users are preferred over bronze users.

Figure 3:
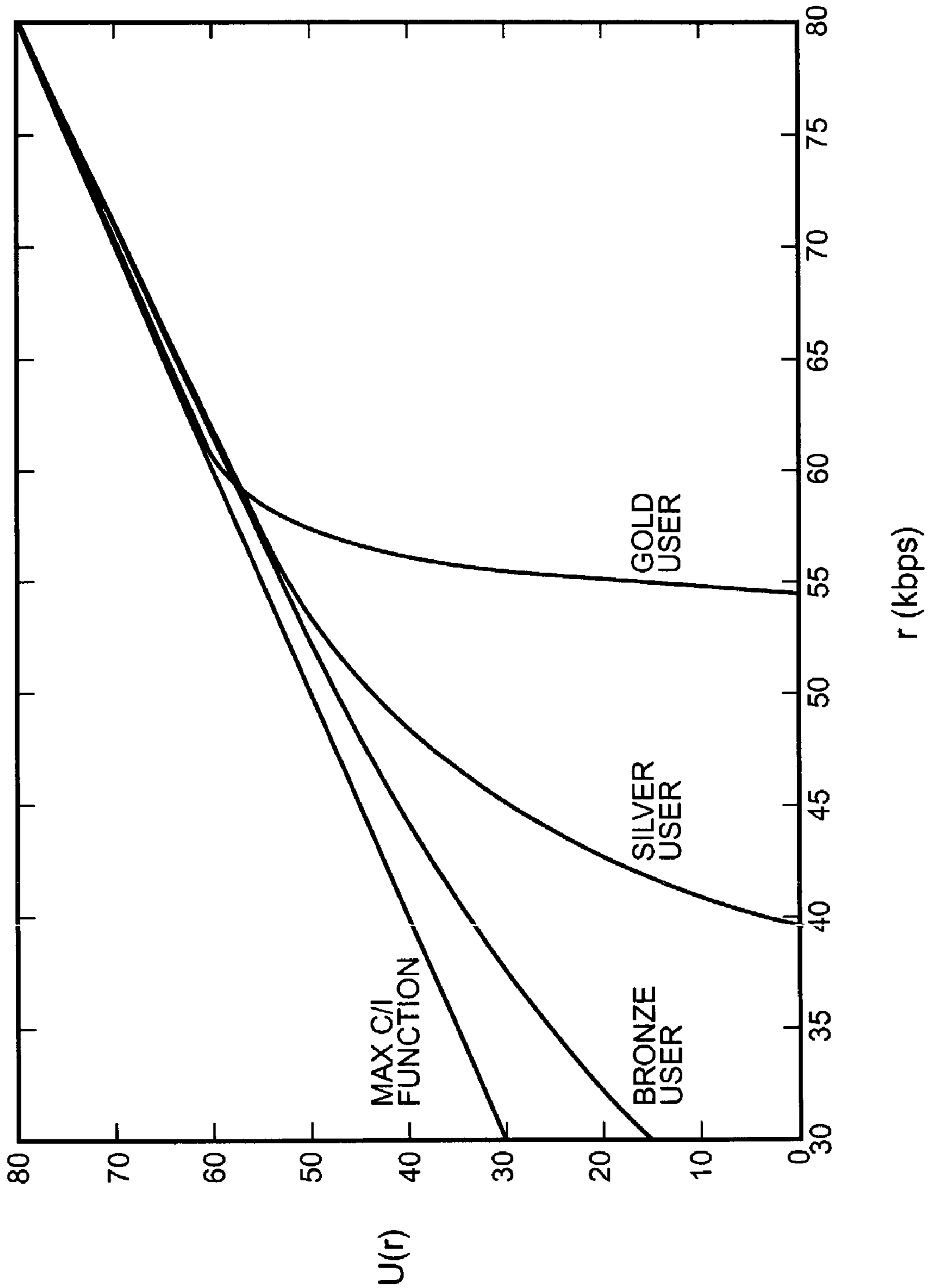
FIG. 3 is a diagram of exemplary "utility functions" for packet data channel scheduling operations based on user class QoS constraints.

FIG. 3 illustrates an exemplary implementation where a primary QoS constraint considered by scheduler 50 is the average served rate, i.e., user throughput. Each user's baseline utility function is the Max C/I function, i.e., $G_i(r)=U(r)$. This baseline function is modified according to user class such that the gradient of each user's utility function increases rapidly below a given served rate. With this approach, the served rate may be set by user class so that each class of user is scheduled so that all users in each class are substantially served at the desired average served rate providing the radio conditions for each user support the targeted average served rate.

Given the limited capacities of the packet data channels being scheduled, the scheduler 50 must decide whether the admission of prospective users would excessively compromise its ability to meet ongoing service requirements for the existing users. Admissions controller 52 supports scheduler 50 by assessing the projected impact of admitting prospective users based on estimating the "penalty" that would be incurred by admitting each prospective user. In this context, the term "penalty" reflects the scheduler's ability (or inability) to meet the service constraints of the existing users. By determining or otherwise estimating the penalty that would result from the admission of a prospective new user, the admission controller 52 admits new users based on whether such admission would unduly compromise the scheduler's ongoing ability to meet the service constraints for users of the shared channel.

In an exemplary penalty-based approach to admission control, the penalty associated with each user reflects an amount by which that user's associated QoS constraints are not met. As those QoS constraints are reflected in each user's barrier function, $B_i(r)$, the penalty for the ith user may be expressed as $P_i(r)=-B_i(r)$ whenever that user's QoS constraints are not being met by scheduler 50.

Therefore, the total user penalty for a given group of users sharing a given packet data channel may be expressed as, $$P(\vec{r}) = \sum_{i}^{N} P_i(r_i) \tag{4}$$

where N=the number of users being scheduled and $P_i(r_i)$=the penalty for the ith user having an average served rate of $r_i$. The total user penalty is therefore reflective of the overall amount by which the current users' QoS constraints are not being met by scheduler 50, and provides a metric for use by admission controller 52 in determining whether new users should be admitted.

Let P(t) denote the total user penalty at time t for a current group of users sharing a packet data channel. Because RBS 32 is aware of the rates of all current connections associated with the current users and has knowledge of the corresponding barrier functions, it can compute the current P(t) for the channel and report it to the BSC 30. In turn, BSC 30 has knowledge about the requested connection (i.e., data rates, etc.) of a given prospective new user and can thus use the current total penalty reported by RBS 32 to estimate what the total penalty would be if the prospective user were admitted. Therefore, in an exemplary embodiment, RBS 32 periodically determines the current total penalty P(t) for each of the shared packet data channel(s) it supports, and reports these penalty values to BSC 30 for use in admission control. A preferred reporting period is matched to the expected rate at which new connection requests are received by the BSC 30.

For example, suppose that a prospective new user requests admission to a given shared packet data channel provided by one of the RBSs 32 supported by BSC 30. The expected increase in the total penalty P(t) that will be incurred by admitting the prospective new user may be represented as $\Delta$, with the value of $\Delta$ depending upon the current total penalty P(t) and the type of connection/service desired by the prospective user, i.e., some data services are more resource intensive and/or require much higher average served rates than others.

Admission controller 52 may associate a different penalty threshold $\gamma_j$ with each user class j. In this manner, admission controller 52 may bias its admission of new users based on user class (or individual user preferences). For example, in an exemplary implementation the penalty threshold for gold users is set to ensure that QoS constraints are met for all users. A lower threshold is set for silver users, such that the admission controller 52 would begin blocking prospective new silver users above a defined penalty threshold in order to maintain some capacity for newly arriving gold users. The bronze user penalty threshold would be set even lower such that admission control of bronze users preserves some capacity in order to admit possible new silver (and gold) users.

As an example, assume that the operator of network 10 has defined the gold, silver, and bronze user classes as illustrated in FIG. 3. With the class-biased operations of admission controller 52, the admission-blocking probabilities of bronze class users is higher than that of silver class users, which in turn will be higher than that of gold class users. That is, bronze users are less likely to be admitted than silver users, and silver users are in turn less likely to be admitted than gold users. Such preferential admittance is achieved by manipulating the penalty threshold $\gamma_j$ for each user class as generally explained above.

As long as all users achieve their minimum rates then the network operator would like to maximize the overall throughput, i.e., bias scheduling toward the Max C/I approach. This approach makes sense for an operator that charges users a fixed monthly rate that varies by user class for a certain amount of transferred data (e.g. 20 MB per month) and further charges a fixed rate per MB (for all users) above this minimum allocation. For this example, then, each user's base function is simply G(r)=r (i.e., baseline Max C/I scheduling). That base function is then modified using an exponential barrier function such that the resulting utility function for each user is given as, $$U(r)=r+(1-e^{-\beta_j(r-64)}), \tag{5}$$

where the subscript j in the exponent denotes the user's class, e.g., gold, silver, bronze, and where r is given in Kbps, i.e., "64" equals a nominal served rate target of 64 Kbps.

Continuing the example, assume that the packet data channel of interest is currently being used by eight gold users, eight silver users, and eight bronze users, and that the total channel throughput is 1.560 Mbps. Furthermore, assume that $\beta_j$ is 0.040, 0.035, 0.030 for the gold, silver and bronze users respectively. In an exemplary arrangement, the penalty thresholds are set as $\gamma_{gold}=1.5$, $\gamma_{silver}=1.0$, and $\gamma_{bronze}=0.5$. Scheduler 50 attempts to equalize the gradients among the users'utility functions, which results in average throughputs in this example of 68.7, 65.6, and 60.7 Kbps, respectively, for the gold, silver and bronze users. The total penalty, P(t), for the current collection of gold, silver, and bronze users is given by, $$\begin{aligned} P(t) &= -8(1-e^{-0.40(68.7-64)}) - \\ &\quad 8(1-e^{-0.35(65.6-64)}) - \\ &\quad 8(1-e^{-0.30(60.7-64)}) \\ &= -0.95. \end{aligned} \tag{6}$$

A negative (or zero) penalty value indicates that scheduler 50 can meet the QoS constraints for all current users.

At this point, assume that a prospective new gold class user desires admission to the shared packet data channel. For simplicity, assume that, if the connection is accepted, the capacity of the channel remains the same. In reality the capacity generally will change since it depends to some extent on the number of users being served, and it should be understood that admission controller 52 may incorporate such capacity considerations into its admission controls. Regardless, the admission controller 52 must determine the impact of admitting the prospective new user. That is, the admission controller 52 must estimate the total penalty that would be incurred with admission of the new user, and compare that penalty value with the defined penalty threshold corresponding to that user's class (or an individual user setting in some embodiments), to determine whether the prospective new user should be admitted.

If scheduler 50 is presumed to work toward equalizing the utility function gradients among the users, including the prospectively admitted new user, then the admission controller can re-calculate the expected throughputs for the different user classes, which can be shown to be 66.3, 62.8 and 57.5 Kbps for the gold, silver and bronze users in this example. Thus, with a target rate of 64 Kbps, the silver and bronze users are, to some extent, underserved. One sees that the service rate differences are accounted for by the differences in the barrier function curves for the different user classes as shown in FIG. 3. The total penalty (without admission of the new user) was −0.95, indicating that all users are being served above the target rate.

Admission controller 52 then computes what the estimated penalty would be with the admission of the prospective new gold class user (i.e., 9 gold class users, 8 silver, and 8 bronze). With the assumption of equalized utility function gradients among the user classes, the total penalty would change from −0.95 to 1.24 if the new user were admitted, yielding a penalty change Δof 1.24−(−0.95)=2.19. Since the penalty threshold for gold class users is 1.5, i.e., $\gamma_{gold}=1.5$, which is less than P(t)=1.24, the new gold class user is admitted. Note that if the user were of either the silver ($\gamma_{silver}=1.0$) or bronze ($\gamma_{bronze}=0.5$) classes, the admission controller 52 would have calculated the projected total penalty that would be expected for the admission of the silver (or bronze) user and block such admission if the projected penalty is above the silver threshold (or bronze threshold). As those threshold levels are lower than for the gold users, silver and bronze users are more likely to be blocked by admission controller 52.

Thus, admission controller 52 may be made to perform admission control in observance of user class preference and/or using individual user preferences, i.e., individual users may be associated with contracted-for penalty thresholds, in a manner that permits scheduler 50 to perform ongoing user scheduling in accordance with one or more QoS constraints.

Illustrating this point, suppose instead that the prospective user had been of the bronze class. If the bronze class user was admitted, the resultant throughputs would be 66.6, 63.2 and 57.9 Kbps for the gold, silver and bronze users respectively and the resulting penalty is P(t)=1.23. Since P(t) is higher than the value of the defined penalty threshold for bronze users, e.g., greater than $\gamma_{bronze}=0.5$, the requested connection for prospective bronze user is rejected by admission controller 52.

Figure 4:
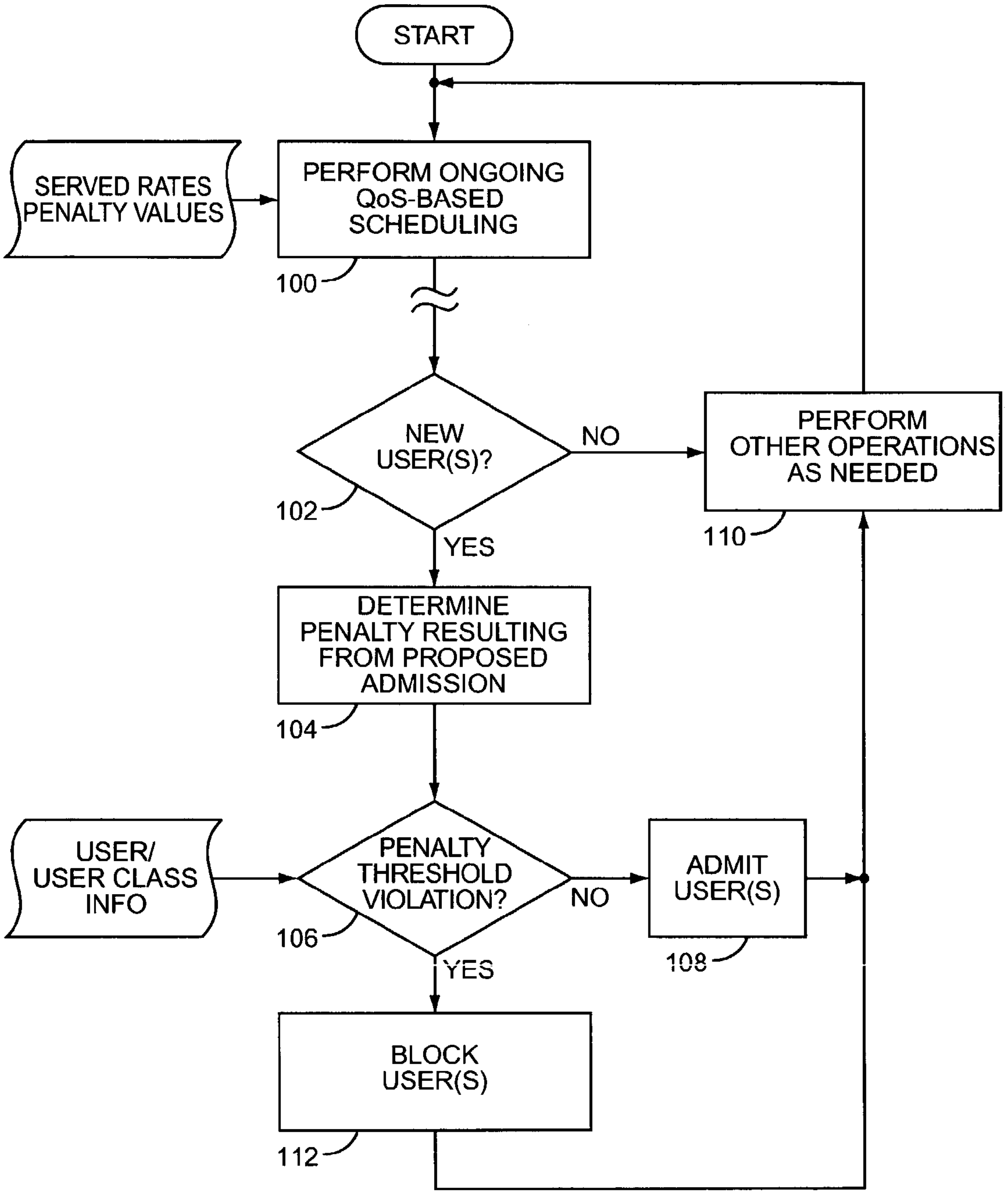
FIG. 4 is a diagram of exemplary flow logic supporting QoS-based admission control in accordance with the present invention.

FIG. 4 illustrates exemplary flow logic illustrating admission control operations. Processing begins with scheduler 50 performing ongoing scheduling operations of the one or more shared packet data channels provided by the RBS 32. In support of these operations, the RBS 32 periodically reports the current total penalty values, P(t), for each shared channel. BSC 30 optionally receives "served rate" information from the RBS 32, i.e., average data rates, that may be used by BSC 30 to refine its penalty calculations.

If one or more prospective new users have requested connections with network 10 that would require their admission to a shared channel being scheduled by BSC 30 (Step 102), the admission controller 52 estimates the total penalty, P(t), that would arise with the admission of the prospective new user to the channel in question. Note that where multiple prospective users have requested access to one or more shared channels, admission controller 52 preferably performs sequential admission of the prospective users for each shared channel in question. As illustrated in FIG. 2, the admission controller 52 may be functionally implemented as a set of admission controllers 52-1 . . . 52-N, each of which provides admission control for a given shared channel, such that admission control for multiple channels may be managed in parallel.

In any case, the admission controller 52 determines, for each prospective new user, whether the admission of that user to the shared channel in question would result in a total penalty value that exceeds the penalty threshold associated with the prospective user (Step 106). Referring to the earlier discussion, user class data, or possibly individual user profile data, informs such determinations by providing defined threshold values against which the estimated penalty increases are compared. Such data may comprise the class-based penalty thresholds detailed earlier in the gold/silver/bronze user class example but, of course, the admission controller 52 may use other information, such as user-specific provisioning information included in or otherwise accessible to BSC 30, which might specify penalty threshold information. With that approach, individual users and/or user classes may be preferentially admitted by admission controller 52.

Regardless, if the estimated total penalty that would result from the admission of each prospective user does not violate the defined penalty threshold for that user, admission controller 52 admits the user (Step 108), and continues with other operations as needed (Step 110). That is, BSC 30 continues its ongoing scheduling operations and performs other functions as needed. Those skilled in the art will appreciate that the BSC 30 is itself a complex system and generally performs many other functions in concert with the illustrated scheduling operations. Conversely, if the admission of a prospective new user would violate the penalty threshold defined for that user, admission controller 52 blocks the admission of that user (Step 112) and BSC 30 continues its ongoing operations as needed (Step 110).

While not necessary to understanding the QoS-based admission control operations of admission controller 52, it may be helpful to note that admission controller 52 generally will incorporate additional factors into its admission control decisions. For example, rather than simply assuming that the capacity of the shared channel in question remains fixed, the admission controller 52 may update the nominal channel capacity in its penalty calculations as more and more users are admitted to reflect the fact that actual channel capacity is at least a weak function of the number of users sharing that channel. Thus, as the admission controller 52 calculates the throughput-based penalty change, it may consider the influence of the current number of users of the shared channel on channel capacity.

Further, the admission controller 52 may consider the reserve capacity or bandwidth of other network resources involved in supporting a prospective new user, since other resource limitations might also prevent admission of the prospective user. In short, those skilled in the art should appreciate that the admission controller 52 performs the QoS-based admission control described in detail above, but that the overall set of criteria evaluated by admission controller 52 in determining whether to admit a particular user at a particular time may depend on additional factors.

Additionally, it should be noted that the penalty threshold(s) used by admission controller 52 may be time-varying or otherwise dynamically adjusted. For example, where network 10 supports a mix of voice and data users, such as in 1xEV-DV networks, and where admission control is applied to the data users, the penalty threshold(s) may be dynamically adjusted as a function of the number of voice users. Thus, the current number of voice users being supported by the network, e.g., the BSC 30, may influence the penalty threshold(s), and/or the number of current data users may be used to dynamically change such thresholds.

In general, then, the present invention provides admission control to a QoS-based scheduler such that the admission of new users to one or more shared network resources is managed in consideration of the network's ongoing ability to meet the QoS constraints associated with its existing users. In an exemplary embodiment, admission controller 52 manages the admission of new users to one or more shared packet data channels, such that users are admitted if such admission would not excessively degrade the ongoing QoS provided to existing users of the channel(s).

Moreover, the admission decisions may be biased based on a per user basis and/or on user class, such that some users or classes of users are preferentially admitted, thereby allowing network operators gain additional revenue by providing enhanced services to premium users. Further, while the above detailed examples used served rate as an exemplary QoS constraint to be considered in admission control, additional or other QoS constraints such as packet jitter and packet delay may serve individually or in any combination as the QoS constraints of interest. Therefore, the present invention is not limited to the foregoing exemplary details but rather is limited only by the following claims and their reasonable equivalents.

What is claimed is:

1. A method of controlling admission to a shared resource in a wireless communication network comprising:

scheduling use of the shared resource by a plurality of users based on one or more quality-of-service (QoS) constraints associated with those users;

receiving a service request for use of the shared resource by a new user;

determining a QoS penalty that would be incurred by admitting the new user to the shared resource;

admitting the new user if the QoS penalty would not exceed a threshold; and blocking the new user from the shared resource if the QoS penalty would exceed the threshold.

2. The method of claim 1, further comprising defining two or more user classes such that admitting or blocking the new user is biased by a user class designation of the new user.

3. The method of claim 2, further comprising defining greater thresholds for preferred user classes such that users of the preferred user classes are admitted with a higher probability than users of non-preferred classes.

4. The method of claim 1, wherein determining the QoS penalty comprises determining the QoS penalty based on an amount by which the one or more QoS constraints for users of the shared resource would be violated by admitting the new user.

5. The method of claim 1, wherein the shared resource comprises a packet data channel and the one or more QoS constraints comprise served rate constraints associated with users of the shared packet data channel, and further wherein determining the QoS penalty comprises determining the QoS penalty based on an amount by which the served rate constraints would be violated with admission of the new user.

6. The method of claim 5, further comprising defining two or more user classes with each user class having a different penalty threshold to be used as the threshold.

7. The method of claim 6, wherein each user class is associated with a class-weighted penalty calculation and wherein determining the QoS penalty comprises determining class-weighted penalty amounts for users of the shared packet data channel.

8. The method of claim 5, further comprising periodically receiving penalty information from one or more radio base stations for performing admission control at a base station controller.

9. The method of claim 1, further comprising dynamically changing the threshold.

10. The method of claim 9, wherein dynamically changing the threshold comprises adjusting the threshold based on a number of voice users being supported by the network.

11. A base station controller for use in a wireless communication network comprising:

a radio base station interface to communicate with a radio base station providing scheduled data transmissions on a shared packet data channel to a plurality of users based on one or more Quality-of-Service (QoS) constraints associated with those users;

control logic to control the radio base station and provide the data to the radio base station for scheduled transmission on the shared packet data channel; and an admission controller to control admission of new users to the shared packet data channel based on:

determining an estimated QoS penalty that would be incurred by the admission of a new user to the shared packet data channel;

admitting the new user if the estimated QoS penalty is below a penalty threshold; and blocking the new user if the QoS penalty exceeds the penalty threshold.

12. The base station controller of claim 11, wherein the one or more QoS constraints include at least served rate constraints, and wherein the base station controller determines the estimated QoS penalty based on the ability to meet the served rate constraints.

13. The base station controller of claim 11, wherein the base station controller accesses user class information that includes a penalty threshold for each user class such that the base station controller biases the admission of new users as a function of user class.

14. The base station controller of claim 13, further comprising one or more storage elements for storing the user class information.

15. The base station controller of claim 13, wherein first and second user classes are defined, and wherein a first penalty threshold associated with the first user class is greater than a second penalty threshold associated with the second user class, such that the base station controller preferentially admits users of the first user class over users of the second user class.

16. The base station controller of claim 11, wherein determining the estimated QoS penalty comprises determining a total penalty that is based on amounts by which the one or more QoS constraints would be violated if the new user were admitted.

17. The base station controller of claim 16, wherein the one or more QoS constraints comprise served rate constraints associated with users of the shared packet data channel, and further comprising determining the total penalty based on amounts by which the served rate constraints would be violated with admission of the new user.

18. The base station controller of claim 17, wherein the base station controller determines the total penalty as a function of user class-weighted penalty amounts for the users of the shared packet data channel.

19. The base station controller of claim 11, wherein the base station controller dynamically adjusts the penalty threshold.

20. The base station controller of claim 19, wherein the base station controller dynamically adjusts the penalty threshold based on a number of voice users being supported by the base station controller.

21. The base station controller of claim 19, wherein the base station controller dynamically adjusts the penalty threshold based on the number of users sharing the packet data channel.

22. A radio base station for use in a wireless communication network comprising:

a base station controller interface to communicate with an associated base station controller;

a scheduler to schedule data transmissions to a plurality of users on a shared packet data channel supported by the radio base station according to one or more Quality-of-Service (QoS) constraints; and control logic to periodically compute a current QoS penalty representing an amount by which the QoS constraints are not being met;

said control logic configured to periodically report the current penalty to the base station controller via the base station controller interface for use in admission control operations at the base station controller.

23. The radio base station of claim 22, wherein the one or more QoS constraints include one or more target average data rates at which the plurality of users should be served, and wherein the control logic computes the current penalty based on an extent to which actual average served rates of the plurality of users fall short of the one or more target average data rates.

24. The radio base station of claim 23, wherein each of the plurality of users is associated with a defined user class, and wherein the scheduler biases scheduling of the plurality of users according to user class.

25. The radio base station of claim 23, wherein the scheduler evaluates each user's scheduling preference based on a barrier function defined for the corresponding user class, and wherein the control logic computes the current penalty based on the barrier functions defined for the user classes comprising the plurality of users sharing the packet data channel.

26. A base station system for use in a wireless communication network comprising:

a radio base station to transmit data to a plurality of users on a shared packet data channel according to scheduler that schedules the data transmissions based on one or more Quality-of-Service (QoS) constraints; and a base station controller to control operation of the radio base station and provide the data for transmission on the packet data channel;

said radio base station configured to periodically report current penalty values representing an amount by which the one or more QoS constraints are not being met; and said base station controller configured to control admission of new users to the shared packet data channel based on using the current penalty values to determine an estimated penalty that would be incurred with the admission of each new user.

27. The base station system of claim 26, wherein the base station controller is configured to:

determine a user class of a new user desiring admission to the shared packet data channel; and compare the penalty increase for the packet data channel expected to arise from admission of the new user to a class-specific penalty threshold such that new user admission is biased as a function of user class.

28. The base station system of claim 26, wherein the base station system calculates each current penalty value by determining an extent to which the one or more QoS constraints are violated for a current reporting period.

29. The base station system of claim 26, wherein the one or more QoS constraints comprise served rate target values for the users sharing the packet data channel, and wherein the base station system calculates the current penalty value by determining amounts by which the users are underserved during a current reporting period.

* * * * *